United States Patent
Kawamoto et al.

(10) Patent No.: US 9,473,597 B2
(45) Date of Patent: Oct. 18, 2016

(54) IMPLEMENTING MULTIPLE MAC PROTOCOLS USING A SINGLE WIRELESS COMMUNICATION UNIT

(71) Applicant: Oki Electric Industry Co., Ltd., Tokyo (JP)

(72) Inventors: Yasutaka Kawamoto, Tokyo (JP); Masanori Nozaki, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 161 days.

(21) Appl. No.: 13/960,312

(22) Filed: Aug. 6, 2013

(65) Prior Publication Data

US 2014/0105080 A1  Apr. 17, 2014

(30) Foreign Application Priority Data

Oct. 15, 2012 (JP) ................. 2012-227887

(51) Int. Cl.
H04L 29/06 (2006.01)
(52) U.S. Cl.
CPC .................... H04L 69/08 (2013.01)
(58) Field of Classification Search
CPC ............................................. H04L 29/06163
See application file for complete search history.

(56) References Cited

U.S. PATENT DOCUMENTS

| | | | |
|---|---|---|---|
| 8,971,200 B2* | 3/2015 | Van Wyk et al. | 370/252 |
| 2005/0044249 A1* | 2/2005 | Teng et al. | 709/230 |
| 2009/0063879 A1 | 3/2009 | Kawamoto | |
| 2009/0247094 A1 | 10/2009 | Sakoda | |
| 2011/0310779 A1* | 12/2011 | De Poorter et al. | 370/310 |
| 2011/0310929 A1* | 12/2011 | Petite et al. | 375/130 |
| 2012/0250671 A1* | 10/2012 | Kawamoto | H04L 29/06 370/345 |
| 2012/0263112 A1* | 10/2012 | Sum | H04W 16/14 370/328 |
| 2012/0314739 A1* | 12/2012 | Bhadra | H04W 40/246 375/219 |
| 2013/0099938 A1* | 4/2013 | Borisov | H04B 1/0003 340/870.02 |
| 2015/0023363 A1* | 1/2015 | Hui et al. | 370/408 |

(Continued)

FOREIGN PATENT DOCUMENTS

| | | |
|---|---|---|
| JP | 2009-060485 A | 3/2009 |
| JP | 2009-239385 A | 10/2009 |
| JP | 2009-302799 A | 12/2009 |

OTHER PUBLICATIONS

IEEE Computer Society. "IEEE Standard for Local and metropolitan area networks—Part 15.4: Low-Rate Wireless Personal Area Networks (LR-WPANs) Amendment 3: Physical Layer (PHY) Specifications for Low-Data-Rate, Wireless, Smart Metering Utility Networks" IEEE Std 802.15.4g™—2012, pp. 1-252. Apr. 27, 2012.

(Continued)

*Primary Examiner* — Hassan Kizou
*Assistant Examiner* — Deepa Belur
(74) *Attorney, Agent, or Firm* — Rabin & Berdo, P.C.

(57) ABSTRACT

There is provided a wireless communication apparatus capable of using a first MAC protocol and a second MAC protocol including one wireless communication unit. The wireless communication unit includes: a MAC protocol control unit carrying out state transitions and processing in a present state according to the first MAC protocol and the second MAC protocol; and a frame communication unit carrying out communication of frames according to the first MAC protocol and communication of frames according to the second MAC protocol whose frame format is the same as the frames according to the first MAC protocol.

20 Claims, 8 Drawing Sheets

(56) References Cited

U.S. PATENT DOCUMENTS

| | | | |
|---|---|---|---|
| 2015/0023369 A1* | 1/2015 | Hui | H04L 29/06537 370/463 |
| 2015/0207772 A1* | 7/2015 | Walker | H04L 69/18 370/392 |
| 2015/0236947 A1* | 8/2015 | Kobayashi | H04L 45/20 370/254 |
| 2016/0112951 A1* | 4/2016 | Batra | H04W 76/026 370/311 |
| 2016/0127515 A1* | 5/2016 | Kim | H04L 69/18 370/254 |

OTHER PUBLICATIONS

IEEE Computer Society, "IEEE Standard for Local and metropolitan area networks—Part 15.4: Low-Rate Wireless Personal Area Networks (LR-WPANs) Amendment 1: MAC sublayer", IEEE Std 802.15.4e™—2012, pp. 1-225. Apr. 16, 2012.

Part 11: Wireless LAN Medium Access Control(MAC) and Physical Layer(PHY) Specifications, ANSI/IEEE Std 802.11, 1999 edition(R2003) pp. 3,34,35,37,43,44, Jun. 2003.

* cited by examiner

IMPLEMENTING MULTIPLE MAC PROTOCOLS USING A SINGLE WIRELESS COMMUNICATION UNIT

CROSS REFERENCE TO RELATED APPLICATION(S)

This application is based upon and claims benefit of priority from Japanese Patent Application No. 2012-227887, filed on Oct. 15, 2012, the entire contents of which are incorporated herein by reference.

BACKGROUND

The present invention relates to a wireless communication apparatus and a wireless communication program which can be applied to, for example, smart meters.

IEEE 802.15.4 g (hereinafter referred to as "Non-Patent Document 1") defines a MAC (Media Access Control) protocol standard (hereinafter simply "Normal 15.4 Protocol") for typical wireless data communication. IEEE 802.15.4e (hereinafter referred to as "Non-Patent Document 2") defines an extended standard for adopting the above standard to various applications, with CSL (Coordinated Sampled Listening) and RIT (Receiver Initiated Transmission) being defined as standards for low-power data communication within such extended standard. An extended standard for low-power data communication is referred to below as "CSL Protocol".

FIG. 7 is a state transition diagram according to Normal 15.4 Protocol. With Normal 15.4 Protocol, there is only one possible state when standing by for reception, the "15.4 reception standby state" ST11. When performing transmission, the state becomes the "15.4 transmission state" ST12 and frame transmission is carried out. When a frame is being received, the state changes to the "15.4 reception state" ST13. Note that the initial state is the "15.4 reception standby state" ST11.

FIG. 8 is a state transition diagram relating to CSL Protocol. In CSL Protocol, there are two states when standing by for reception, the "CSL reception standby state" ST21 and the "CSL reception idle state" ST22, with the state changing between the two states ST21 and ST22 at fixed intervals. For transmission, the state becomes the "CSL transmission state" ST23 and frame transmission is carried out according to a method unique to CSL so that the frame arrives when the transmission destination node is in the "CSL reception standby state" ST21. When frame reception is being carried out, the state becomes the "CSL reception state" ST24. The "CSL reception standby state" ST21 and the "CSL reception idle state" ST22 differ as to whether a frame can be received from another node. The initial state is the "CSL reception idle state" ST22.

Normal 15.4 Protocol and CSL Protocol are different MAC protocols where the frame transmission method, the operation when standing by for reception, and the like all differ. This means that communication between a node that uses Normal 15.4 Protocol and a node that uses CSL Protocol is not possible.

IEEE 802.15.4 g was established as a wireless communication standard for smart meters. Since information from a smart meter is valuable, such information is gathered by a data center or the like via a plurality of networks such as FAN (Field Area Networks) and HAN (Home Area Networks).

A FAN is a large-scale network where latency on the MAC layer is important, and therefore Normal 15.4 Protocol is used. Conversely, a HAN uses CSL Protocol due to the importance of the low power function. If it is necessary for a smart meter to belong to both networks, the smart meter will need to be compatible with a plurality of MAC protocols.

When a plurality of MAC protocols are to be used by a single wireless node (a wireless communication apparatus, such as a smart meter), as shown in FIG. 9 it is conventional to equip a wireless node 100 with a wireless communication unit 101-1, 101-2 for each protocol to be used. One reason for this is that it is difficult to carry out communication using a plurality of MAC protocols using a single wireless communication unit. It is not conventional to have a single wireless communication unit operate according to a plurality of MAC protocols. If the wireless communication units 101-1, 101-2 are provided for the respective MAC protocols, the wireless communication units 101-1, 101-2 can operate independently and as a result it becomes possible for a single apparatus to simultaneously use a plurality of MAC protocols.

The configuration and operation of FIG. 9 will now be described in brief.

The wireless node 100 includes an apparatus control unit 106 and the two wireless communication units 101-1, 101-2. The wireless communication units 101-1, 101-2 shown in FIG. 9 are written as parts that carry out processing on the MAC layer and the physical layer. The first wireless communication unit 101-1 includes a Normal 15.4 Protocol control unit 102 and a frame communication unit 103. The second wireless communication unit 101-2 includes a CSL Protocol control unit 104 and a frame communication unit 105.

The apparatus control unit 106 carries out various control of the entire node, but the following description will focus on control related to the characteristics of the present invention (i.e., description of control that is unrelated to the characteristics of the present invention is omitted). When a frame is to be transmitted, the apparatus control unit 106 fulfills a function of determining whether transmission according to Normal 15.4 Protocol or transmission according to CSL Protocol is to be carried out (as one example, information on compatible MAC protocols of other nodes is managed and the MAC protocol to be used is decided in accordance with the destination node of the present transmission frame) and passing the frame to be transmitted to the Normal 15.4 Protocol control unit 102 or the CSL Protocol control unit 104 in accordance with the determination result, a function of receiving a frame received according to Normal 15.4 Protocol from the Normal 15.4 Protocol control unit 102, and a function of receiving a frame received according to CSL Protocol from the CSL Protocol control unit 104.

Under the control of the apparatus control unit 106, the Normal 15.4 Protocol control unit 102 fulfills a function of requesting the frame communication unit 103 to carry out frame transmission according to Normal 15.4 Protocol and a function of processing a frame received by the frame communication unit 103 according to Normal 15.4 Protocol and notifying the apparatus control unit 106 of necessary information. State transitions of the Normal 15.4 Protocol control unit 102 are as shown in FIG. 7 described above.

Under the control of the apparatus control unit 106, the CSL Protocol control unit 104 fulfills a function of requesting the frame communication unit 105 to carry out frame transmission according to CSL Protocol and a function of processing a frame received by the frame communication unit 105 according to CSL Protocol and notifying the apparatus control unit 106 of necessary information. State transitions of the CSL Protocol control unit 104 are as shown in FIG. 8 described above.

The frame communication unit 103 and the frame communication unit 105 respectively fulfill a function of transmitting and receiving frames that satisfy the frame formats (see FIG. 4, described later) used by Normal 15.4 Protocol and CSL Protocol.

SUMMARY

However, if a wireless communication apparatus that is compatible with a plurality of types of MAC protocol is configured as shown in FIG. 9, it becomes necessary to provide a plurality of wireless communication units, making the apparatus large and costly.

For this reason, there is demand for a small-scale and low-cost wireless communication apparatus that is compatible with a plurality of MAC protocols and also demand for a wireless communication program capable of realizing such an apparatus.

According to an embodiment of the present invention, there is provided a wireless communication apparatus having one wireless communication unit. The wireless communication unit includes (1) a MAC protocol control unit carrying out state transitions and processing in a present state according to a first MAC protocol and a second MAC protocol; and (2) a frame communication unit carrying out communication of frames according to the first MAC protocol and communication of frames according to the second MAC protocol whose frame format is the same as the frames according to the first MAC protocol.

According to another embodiment of the present invention, there is provided a wireless communication program causing a computer provided in a wireless communication apparatus to function as one wireless communication unit. The wireless communication unit includes (1) a MAC protocol control unit carrying out state transitions and processing in a present state according to a first MAC protocol and a second MAC protocol; and (2) a frame communication unit carrying out communication of frames according to the first MAC protocol and communication of frames according to the second MAC protocol whose frame format is the same as the frames according to the first MAC protocol.

According to the aspects of the present invention described above, it is possible to provide a small-scale and low-cost wireless communication apparatus that is compatible with a plurality of MAC protocols and to also provide a wireless communication program capable of realizing such an apparatus.

DETAILED DESCRIPTION OF THE EMBODIMENT(S)

Figure 1:
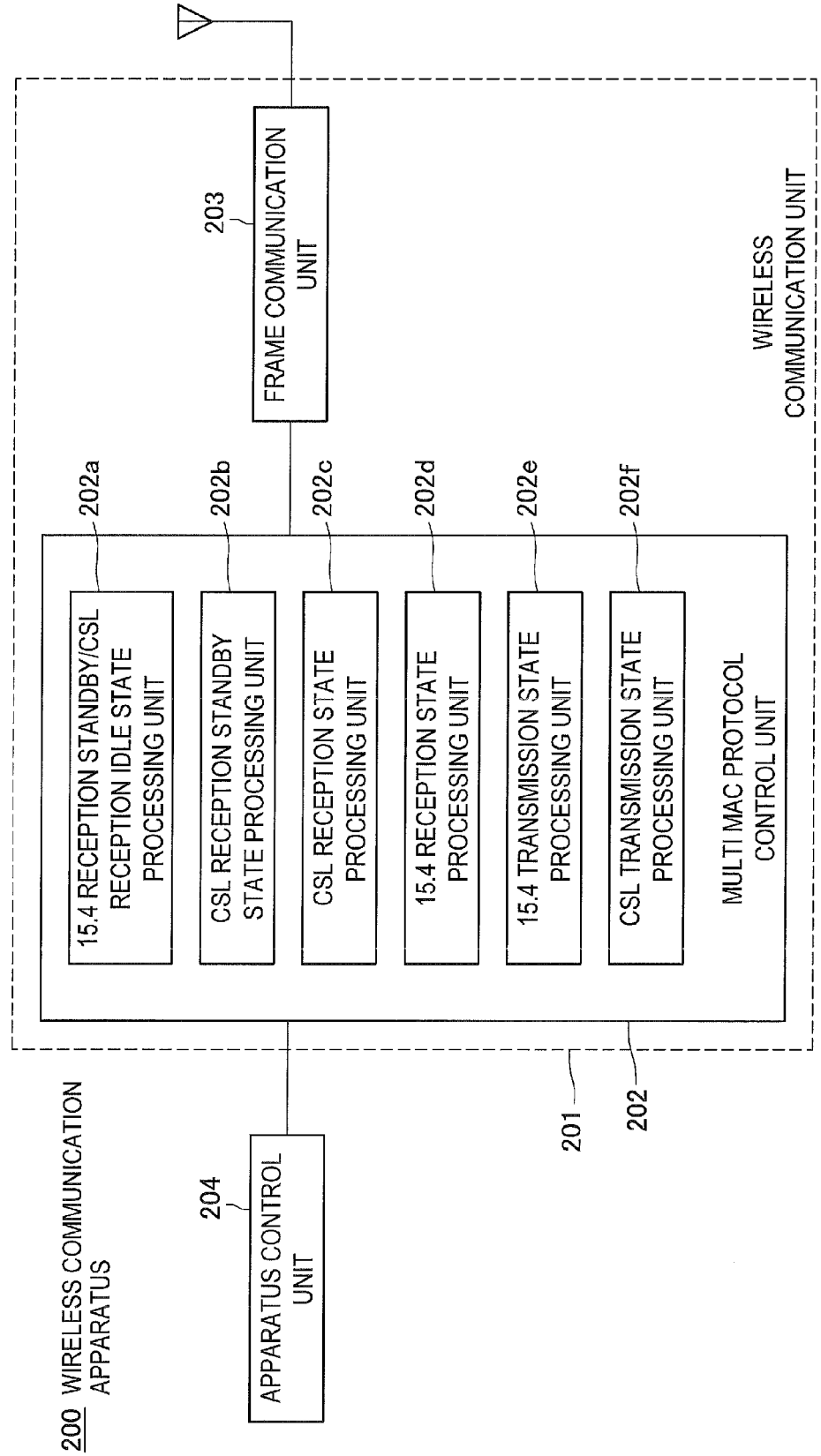
FIG. 1 is a block diagram showing the configuration of a wireless communication apparatus according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) Preferred Embodiment

A preferred embodiment of a wireless communication apparatus and a wireless communication program according to the present invention will now be described with reference to the drawings.

Here, the wireless communication apparatus according to the present embodiment is an apparatus that needs to be compatible with frame communication according to Normal 15.4 Protocol and with frame communication according to CSL Protocol. As one example, the wireless communication apparatus according to the present embodiment is capable of use as a node that constructs a FAN and as a node that constructs a HAN.

(A-1) Configuration of Embodiment

FIG. 1 is a block diagram showing the configuration of a wireless communication apparatus according to the present embodiment. Although some of the structural elements shown in FIG. 1 may be realized by hardware or may be realized by software (which includes firmware and the like) executed by a CPU, in functional terms such configuration can be represented as shown in FIG. 1.

In FIG. 1, a wireless communication apparatus 200 according to the present embodiment includes a wireless communication unit 201 and an apparatus control unit 204.

Figure 9:
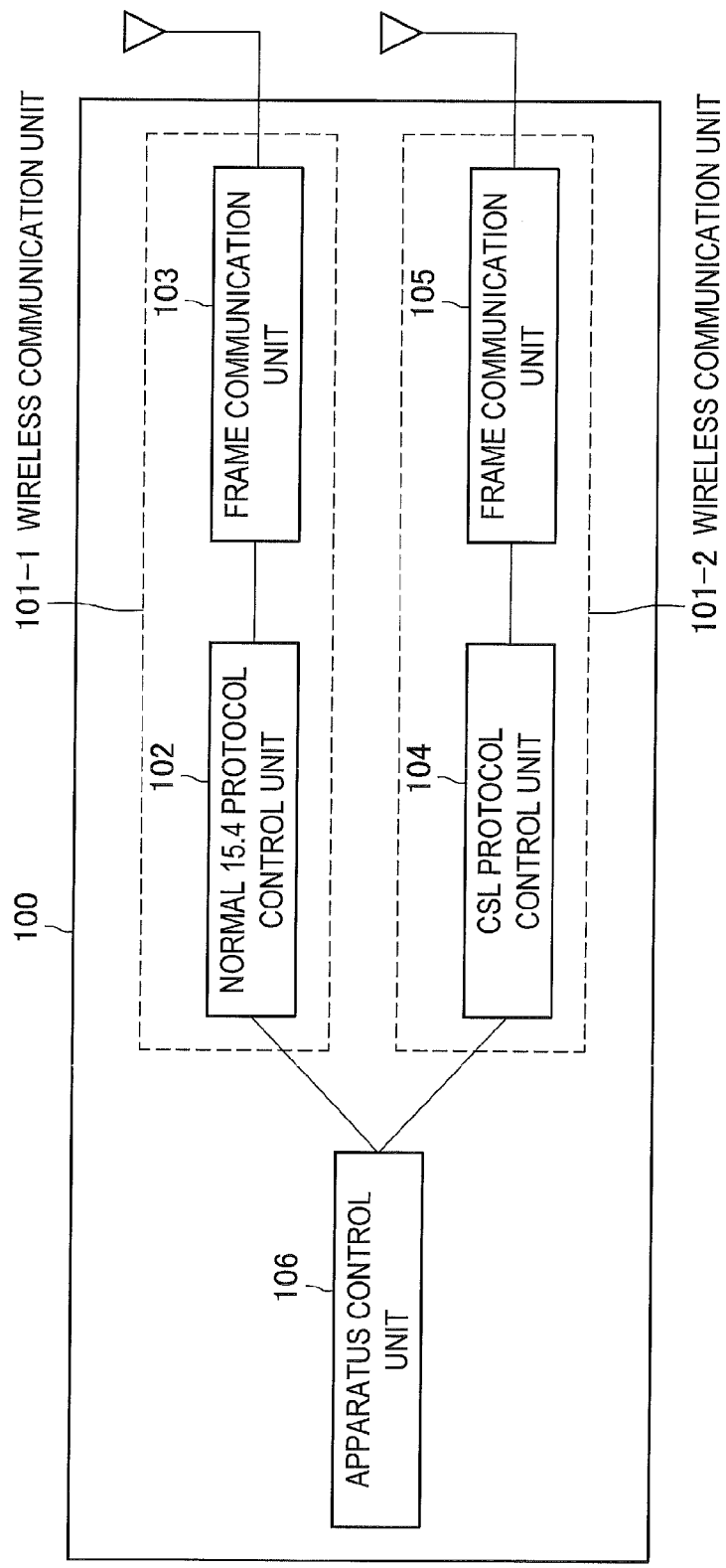
FIG. 9 is a block diagram showing the configuration of a wireless node according to conventional thought.

Although the apparatus control unit 204 fulfills substantially the same functions as the apparatus control unit 106 shown in FIG. 9, since the present embodiment has only one MAC protocol control unit, the apparatus control unit 204 differs to the apparatus control unit 106 as described below. During frame transmission, the apparatus control unit 204 determines whether to transmit using Normal 15.4 Protocol or to transmit using CSL Protocol. The apparatus control unit 204 according to the present embodiment establishes the result of such determination and passes the frame to be transmitted to a multi MAC protocol control unit 202. Also, the apparatus control unit 204 receives a frame received by the MAC protocol control unit 202 according to Normal 15.4 Protocol and receives a frame received by the multi MAC protocol control unit 202 according to CSL Protocol. When such frames are received, information on the MAC protocol in used is also received from the multi MAC protocol control unit 202.

The wireless communication unit 201 is a part that carries out processing on the MAC layer and the physical layer and includes the multi MAC protocol control unit 202 and a frame communication unit 203. In the present embodiment, unlike the apparatus shown in FIG. 9, a single wireless communication unit 201 that is compatible with both Normal 15.4 Protocol and CSL Protocol is provided.

The multi MAC protocol control unit 202 carries out control according to Normal 15.4 Protocol or CSL Protocol. As one example, when a frame transmission request in which the MAC protocol to be used is clearly indicated has been provided from the apparatus control unit 204, the multi MAC protocol control unit 202 carries out control to have frame transmission carried out using whichever of Normal 15.4 Protocol and CSL Protocol is indicated.

Figure 2:
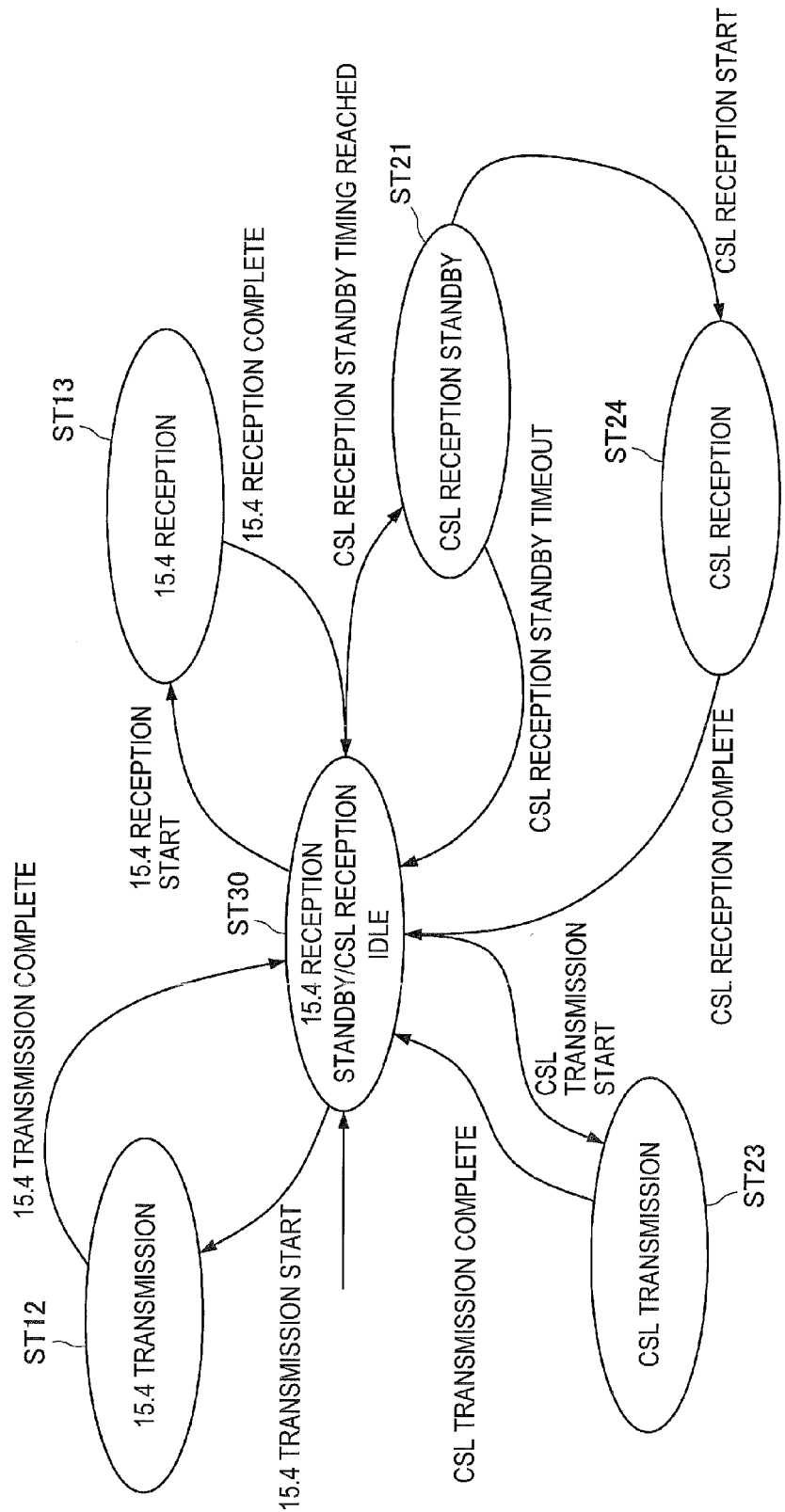
FIG. 2 is a state transition diagram relating to MAC protocol control by a multi MAC protocol control unit in the wireless communication apparatus according to the present embodiment.
Figure 7:
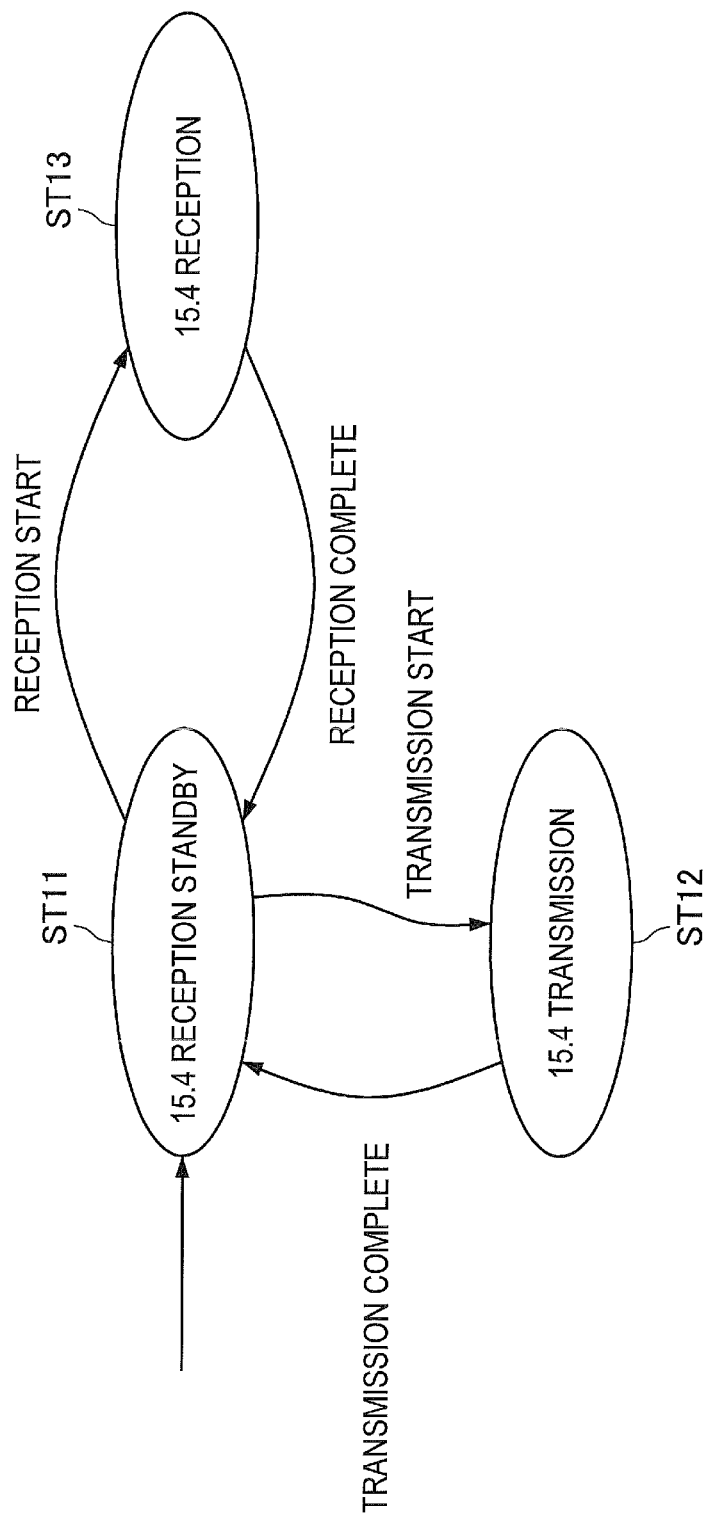
FIG. 7 is a state transition diagram according to Normal 15.4 Protocol.
Figure 8:
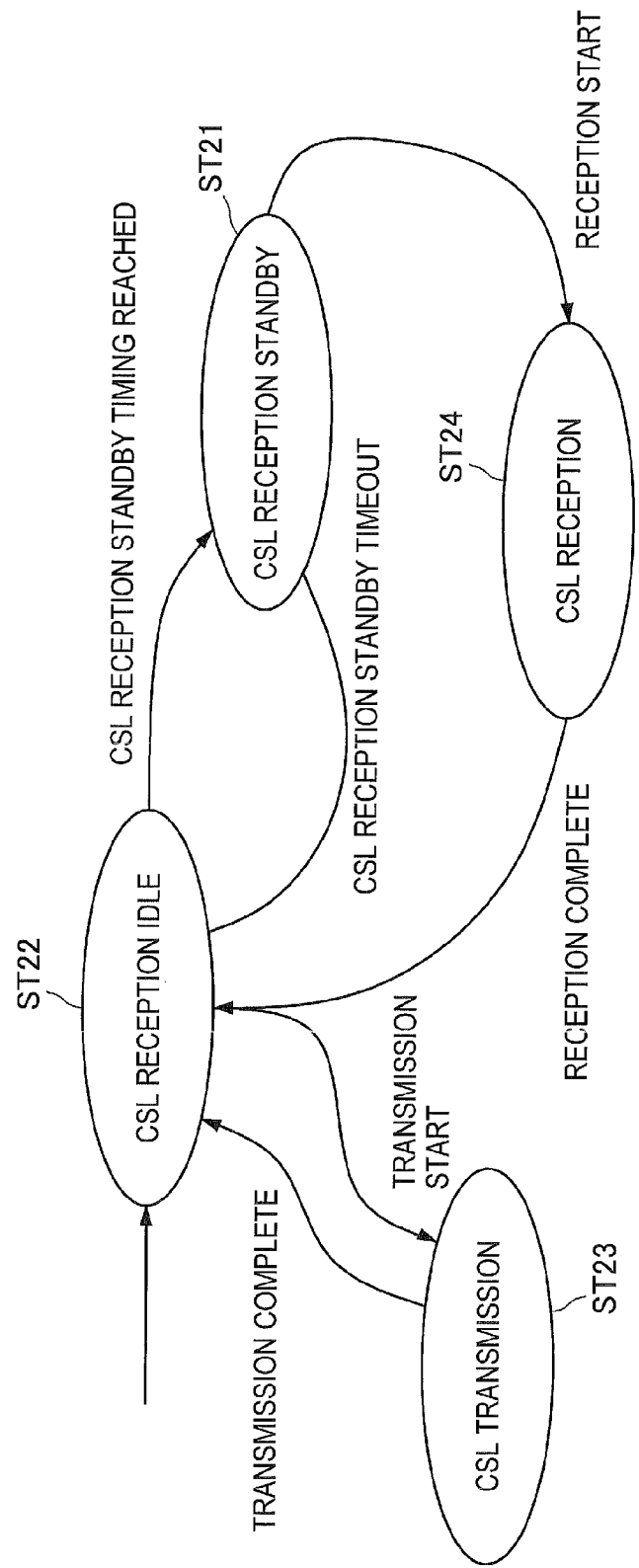
FIG. 8 is a state transition diagram according to CSL Protocol.

FIG. 2 is a state transition diagram relating to MAC protocol control by the multi MAC protocol control unit 202, with the same states as in FIGS. 7 and 8 described earlier indicated using the same reference numerals. The MAC protocol control unit 202 carries out MAC protocol control in accordance with the state transition rules shown in FIG. 2.

The state transitions relating to MAC protocol control by the MAC protocol control unit 202 are a fusion of the state transitions of Normal 15.4 Protocol shown in FIG. 7 and the state transitions of CSL Protocol shown in FIG. 8. As the fusion method, a "15.4 reception standby/CSL reception idle state" ST30 that serves as both the "CSL reception idle state" ST22 and "15.4 reception standby state" ST11 is provided, with the state transitions of Normal 15.4 Protocol and the state transitions of CSL Protocol being linked via this "15.4 reception standby/CSL reception idle state" ST30. Note that the initial state in FIG. 2 is the "15.4 reception standby/CSL reception idle state" ST30. In the present specification, a MAC protocol that carries out control according to state transitions that are a fusion of the state transitions of Normal 15.4 Protocol and the state transitions of CSL Protocol as described above is referred to as "Multi MAC Protocol".

Figure 3:
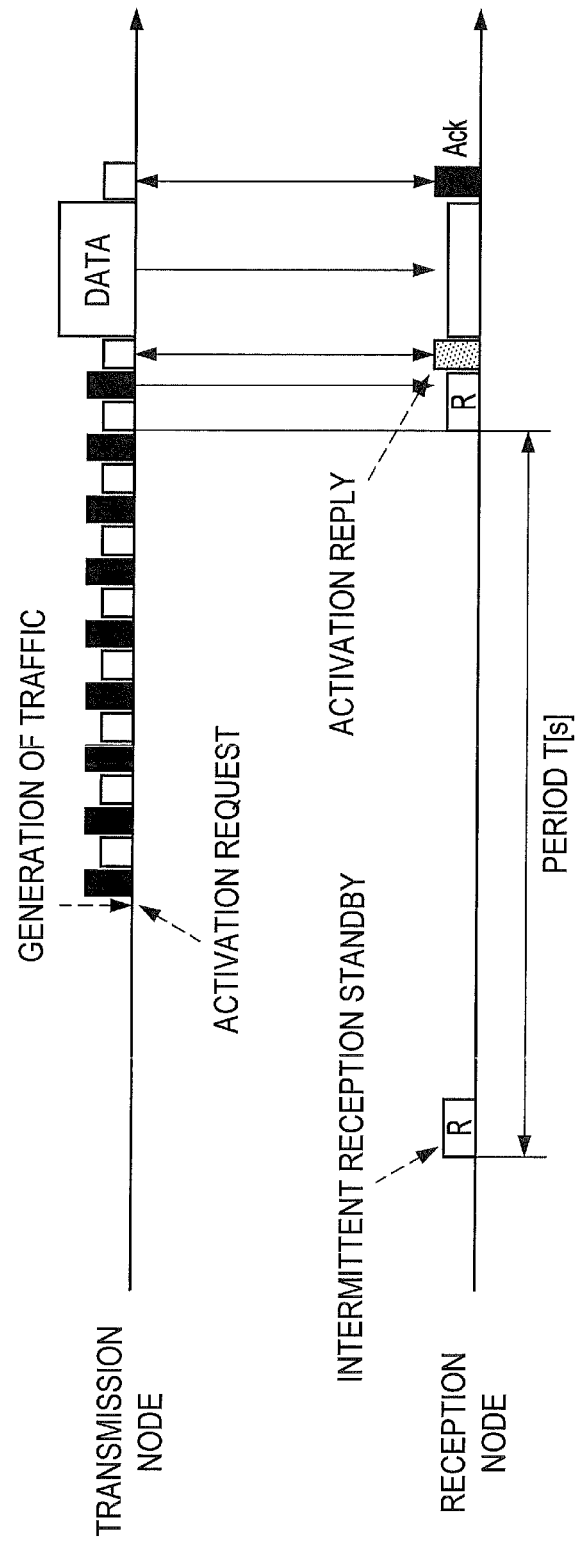
FIG. 3 is a timing chart showing low power data communication according to CSL Protocol.

FIG. 3 is a timing chart showing how low power data communication is carried out according to CSL Protocol.

A node (transmission node) that is attempting to transmit and has generated traffic in the "CSL reception idle state" ST22 enters the "CSL transmission state" ST23 and repeats an operation of transmitting an activation request for transmission and confirming an activation reply from the destination. The destination node (reception node) intermittently (with a period T) enters the "CSL reception standby state" ST21 and in between such periods enters the "CSL reception idle state" ST22. If an activation request is received in the "CSL reception standby state" ST21, the reception node enters the "CSL reception state" ST24, sends an activation reply to the transmission node, successively receives data frames that are transmitted by the transmission node in response, and, when reception of all of the transmitted data frames has been completed, transmits an ACK signal to the transmission node before entering the "CSL reception idle state" ST22.

As should be clear from FIG. 3, power consumption is reduced by allocating a considerable amount of time to the "CSL reception idle state" ST22 in between the "CSL reception standby states" ST21. Since a considerable amount of time is allocated to the "CSL reception idle state" ST22, as in the present embodiment, it is possible, even when the "CSL reception idle state" ST22 also serves as the "15.4 reception standby state" ST11 of Normal 15.4 Protocol, for such state to appropriately receive frames transmitted according to the frame transmission method of Normal 15.4 Protocol. As should also be clear from FIG. 3, since there is a transition to the "CSL reception standby state" ST21 when the standby time assigned to the "15.4 reception standby/CSL reception idle state" ST30 (or, in other words, the idle time assigned to the "CSL reception idle state" ST22) has elapsed, if frames are transmitted in the "CSL transmission state" of CSL Protocol from another node that uses CSL Protocol, it will be possible to receive such CSL Protocol frames.

Figure 4:
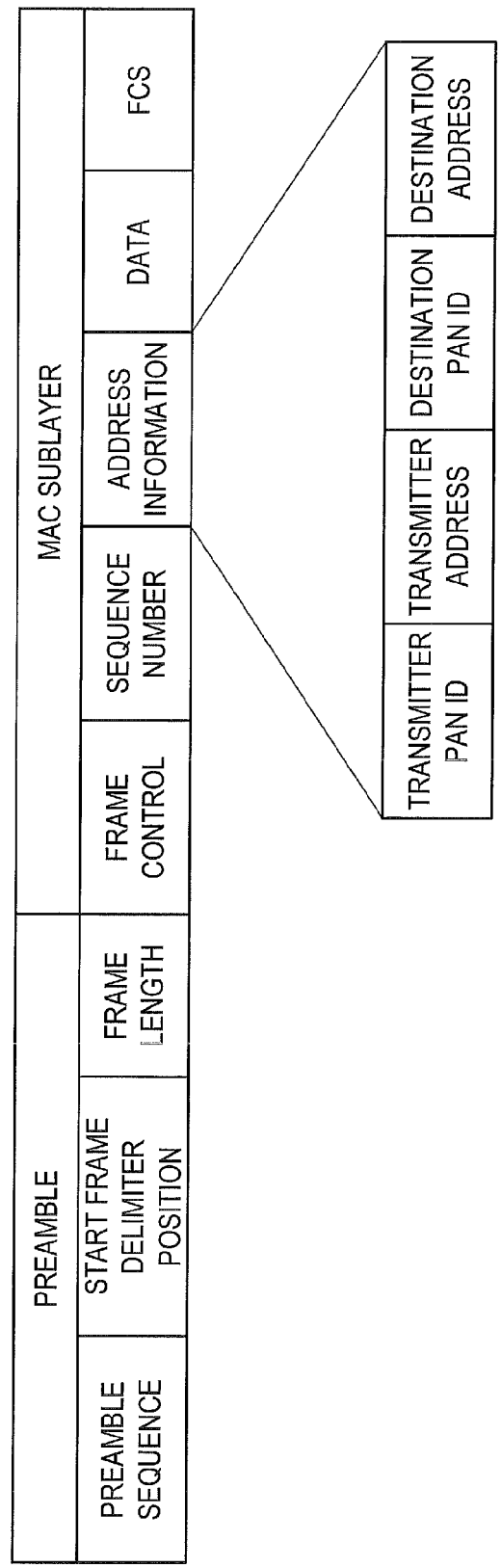
FIG. 4 is a diagram useful in explaining the packet structure (or frame format) defined for an IEEE 802.15.4 data frame.

FIG. 4 is a diagram useful in explaining the packet structure (or frame format) defined for an IEEE 802.15.4 data frame. With the frame format according to this definition, a frame is made up of a preamble and a MAC sublayer. The preamble is composed of a preamble sequence, a start frame delimiter position, and a frame length. The MAC sublayer is made up of a frame control, a sequence number, address information, data, and an FCS. The address information is the PAN_ID (Personal Area Network ID, an ID for identifying the network to which a node belongs) and the address of the transmitter, as well as the PAN_ID and the address of the destination.

Both Normal 15.4 Protocol that is defined by IEEE 802.15.4 g and CSL Protocol that is defined by IEEE 802.15.4e conform to the higher-level standard IEEE 802.15.4 and for this reason Normal 15.4 Protocol and CSL Protocol have a common frame format. Since Normal 15.4 Protocol and CSL Protocol have a common frame format, it is possible for the single wireless communication unit 201 to be compatible with both Normal 15.4 Protocol and CSL Protocol.

Note that when a frame is transmitted according to Normal 15.4 Protocol, a PAN_ID and a transmission channel (described later) for when Normal 15.4 Protocol is used are set in the PAN_ID and the transmission channel, but when a frame is transmitted according to CSL Protocol, a PAN_ID and a transmission channel (described later) for when CSL Protocol is used are set in the PAN_ID and the transmission channel. The setting of the PAN_ID is carried out by a 15.4 transmission state processing unit 202e or a CSL transmission state processing unit 202f, described later, and the setting of a communication channel is carried out by the frame communication unit 203 on receiving information from the multi MAC protocol control unit 202.

In the respective reception standby states ST30, ST21, it is necessary to set the PAN_ID and the communication channel (described later) for the corresponding MAC protocol and to stand by for reception of a frame.

As should be clear from the preceding description, since the wireless communication unit 201 includes the multi MAC protocol control unit 202 that carries out control (MAC protocol control) of the state transitions shown in the state transition diagram in FIG. 2, it is possible for a single wireless communication unit 201 to be compatible with the two MAC protocols "Normal 15.4 Protocol" and "CSL Protocol".

As shown in FIG. 2, the multi MAC protocol control unit 202 has a total of six states relating to MAC protocol control, that is, the "15.4 reception standby/CSL reception idle state" ST30, the "15.4 transmission state" ST12, the "15.4 reception state" ST13, the "CSL reception standby state" ST21, the "CSL transmission state" ST23, and the "CSL reception state" ST24. The MAC protocol control unit 202 includes a 15.4 reception standby/CSL reception idle state processing unit 202a, a CSL reception standby state processing unit 202b, a CSL reception state processing unit 202c, a 15.4 reception state processing unit 202d, the 15.4 transmission state processing unit 202e, and the CSL transmission state processing unit 202f.

Although the 15.4 reception standby/CSL reception idle state processing unit 202a is in charge of processing in the "15.4 reception standby/CSL reception idle state" ST30, the 15.4 reception standby/CSL reception idle state processing unit 202a also fundamentally carries out processing in a reception standby state for Normal 15.4 Protocol (that is, the "15.4 reception standby state" ST11). Accordingly, the 15.4 reception standby/CSL reception idle state processing unit 202a hands over processing rights to the 15.4 reception state processing unit 202d when there has been a reception activation for a frame according to Normal 15.4 Protocol from the frame communication unit 203 and hands over processing rights to the 15.4 transmission state processing unit 202e when there has been a transmission activation for a frame according to Normal 15.4 Protocol from the apparatus control unit 204. In the present embodiment, the 15.4 reception standby/CSL reception idle state processing unit 202a also carries out processing in the "CSL reception idle state" ST22, that is, hands over processing rights to the CSL transmission state processing unit 202f when there has been a transmission activation for a frame according to CSL Protocol from the apparatus control unit 204 and, when a predetermined period has elapsed without a reception activation or a transmission activation for a frame following entry into the "15.4 reception standby state" ST11, hands over processing rights to the CSL reception standby state processing unit 202b.

Note that frame data according to Normal 15.4 Protocol and frame data according to CSL Protocol that is waiting to be transmitted may be buffered in one or both of the apparatus control unit 204 and the MAC protocol control unit 202.

The CSL reception standby state processing unit 202b fundamentally carries out the processing in the reception standby state of CSL Protocol (the "CSL reception standby state" ST21). Accordingly, if there has been a reception activation for a frame according to CSL Protocol from the frame communication unit 203, the CSL reception standby state processing unit 202b hands over processing rights to the CSL reception state processing unit 202c. Although with CSL Protocol there is a transition to the "CSL reception idle state" ST22 when a predetermined period has elapsed in the "CSL reception standby state" ST21, in the present embodiment, the CSL reception standby state processing unit 202b hands over processing rights to the 15.4 reception standby/CSL reception idle state processing unit 202a if a predetermined period has elapsed without a reception activation for a frame according to CSL Protocol.

The CSL reception state processing unit 202c fundamentally carries out processing in the reception state of CSL Protocol (the "CSL reception state" ST24). However, since the "CSL reception idle state" ST22 is not present in the present embodiment, the CSL reception state processing unit 202c hands over processing rights to the 15.4 reception standby/CSL reception idle state processing unit 202a when the reception process for frames according to CSL Protocol has been completed.

The 15.4 reception state processing unit 202d fundamentally carries out the processing in the reception state of Normal 15.4 Protocol (the "15.4 reception state" ST13), and hands over the processing rights to the 15.4 reception standby/CSL reception idle state processing unit 202a when a reception process for frames according to Normal 15.4 Protocol has been completed.

The 15.4 transmission state processing unit 202e fundamentally carries out the processing of a transmission state of Normal 15.4 Protocol (the "15.4 transmission state" ST12) and hands over processing rights to the 15.4 reception standby/CSL reception idle state processing unit 202a when a transmission process for frames according to Normal 15.4 Protocol has been completed.

The CSL transmission state processing unit 202f fundamentally carries out processing in the transmission state of CSL Protocol (the "CSL transmission state" ST23). However, since there is no separate "CSL reception idle state" ST22 in the present embodiment, the CSL transmission state processing unit 202f hands over processing rights to the 15.4 reception standby/CSL reception idle state processing unit 202a when a transmission process for frames according to CSL Protocol has been completed.

The frame communication unit 203 carries out the transmission and reception of frames according to Normal 15.4 Protocol and the transmission and reception of frames according to CSL Protocol. Although the same wireless channel may be used as the wireless channels of Normal 15.4 Protocol and CSL Protocol, it is assumed in the present embodiment that the wireless channel for communication of frames according to Normal 15.4 Protocol and the wireless channel for communication of frames according to CSL Protocol differ. As one example, if the wireless channels are distinguished by carrier frequency, the carrier frequency for communication of frames according to Normal 15.4 Protocol and the carrier frequency for communication of frames according to CSL Protocol are different. During frame transmission, the frame communication unit 203 transmits frames in accordance with the setting of the wireless channel by the multi MAC protocol control unit 202. Also, in the frame reception standby state, the frame communication unit 203 waits for a frame on a wireless channel that is one of a wireless channel relating to Normal 15.4 Protocol and a wireless channel relating to CSL Protocol in accordance with the setting from the multi MAC protocol control unit 202.

(A-2) Operation of Embodiment

Next, the operation of the wireless communication apparatus 200 according to the present embodiment will be described with reference mainly to the state transition diagram in FIG. 2.

The wireless communication apparatus 200 is normally in the "15.4 reception standby/CSL reception idle state" ST30 and, if a predetermined period (referred to below as the "CSL reception standby state period", see T in FIG. 3) has elapsed from the previous "CSL reception standby state" ST21, enters the "CSL reception standby state" ST21 and returns to the "15.4 reception standby/CSL reception idle state" ST30 if a request for reception activation of frames according to CSL Protocol does not arrive from another node during a predetermined period assigned to the "CSL reception standby state" ST21. That is, if transmission and reception of frames is not necessary, the state alternates between the "15.4 reception standby/CSL reception idle state" ST30 and the "CSL reception standby state" ST21.

In the "CSL reception standby state" ST21, frame communication settings (setting of communication channel and setting of the PAN_ID) are made for CSL Protocol so that it is possible to receive a frame transmitted from another node in the "CSL transmission state" ST23. If a frame reception activation arrives, the wireless communication apparatus 200 enters the "CSL reception state" ST24, carries out reception of frames, and returns to the "15.4 reception standby/CSL reception idle state" ST30 when the reception of frames is completed. Here, the expression "the reception of frames is completed" includes not only a case where frames have been properly received according to CSL Protocol but also a case where a reception error has occurred and the reception operation has ended. One example of the latter case is when an error has been detected in a check that uses FCS.

In the "15.4 reception standby/CSL reception idle state" ST30, frame communication settings (setting of communication channel and setting of the PAN_ID) are made for Normal 15.4 Protocol so that it is possible to receive a frame transmitted from another node in the "15.4 transmission state" ST12. If a frame reception activation arrives, the wireless communication apparatus 200 enters the "15.4 reception state" ST13, carries out reception of frames, and returns to the "15.4 reception standby/CSL reception idle state" ST30 when the reception of frames is completed. Here, the expression "the reception of frames is completed" includes not only a case where frames have been properly received according to Normal 15.4 Protocol but also a case where a reception error has occurred and the reception operation has ended.

If, in the "15.4 reception standby/CSL reception idle state" ST30, there has been a frame transmission request using Normal 15.4 Protocol from the apparatus control unit 204, the multi MAC protocol control unit 202 enters the "15.4 transmission state" ST12 and fundamentally carries out frame transmission according to the Normal 15.4 Protocol and returns to the "15.4 reception standby/CSL reception idle state" ST30 after the transmission of frames is completed. When frames are to be transmitted, frame transmission is carried out after making frame communication settings relating to transmission that uses Normal 15.4 Protocol (setting of the communication channel and setting the PAN_ID). Here, the expression "the transmission of frames is completed" includes not only a case where frames have been properly transmitted according to Normal 15.4 Protocol but also a case where an error has occurred and the transmission operation has ended. One example is where frame transmission is terminated due to the occurrence of an error caused by non-arrival of an ACK signal from a destination node within a predetermined period following frame transmission.

The present embodiment includes the following characteristic processing relating to the processing in the "15.4 transmission state" ST12 carried out by the 15.4 transmission state processing unit 202e.

Figure 5:
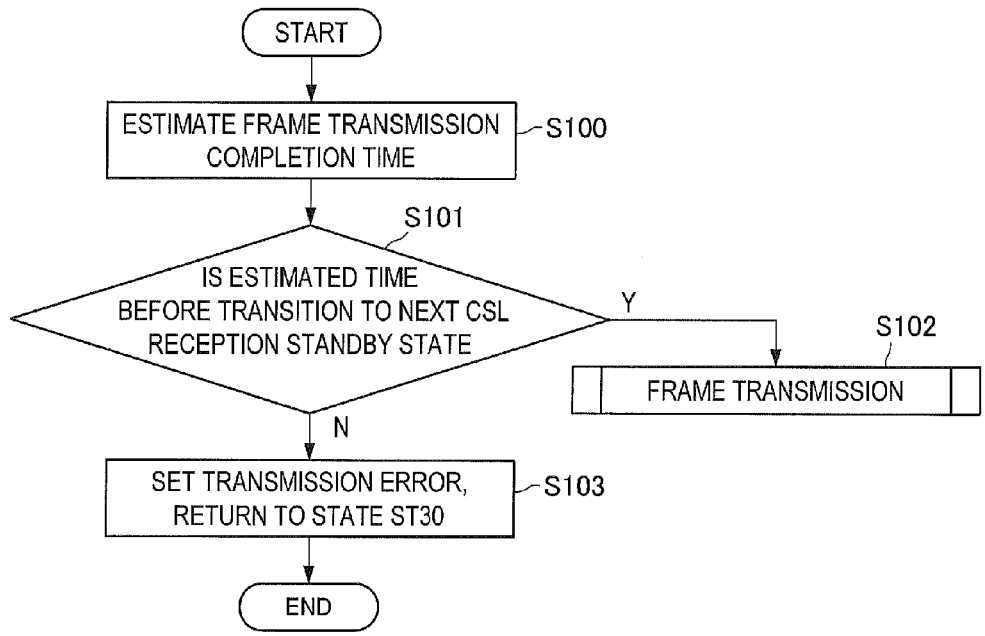
FIG. 5 is a flowchart showing characteristic processing in a "15.4 transmission state" by the wireless communication apparatus according to the present embodiment.

The characteristic processing is processing that estimates the frame transmission completion time and decides whether to execute frame transmission in accordance with the estimation result. FIG. 5 is a flowchart showing the characteristic processing.

After entering the "15.4 transmission state" ST12, first the time at which the frame transmission will be completed is estimated (step S100), and it is determined whether the estimated frame transmission completion time is before the time of the transition to the next "CSL reception standby state" ST21 when the "CSL reception standby state period" has passed from the preceding "CSL reception standby state" ST21 (step S101).

Note that instead of a comparison between times (i.e., points in time), a comparison may be carried out between the time taken until the completion of frame transmission and the remaining time before the transition to the next "CSL reception standby state" ST21. To estimate the completion time of frame transmission (or the time taken until completion), it is possible to use any of a method that calculates from frame length, a method that uses a predetermined period set in advance, a calculating method using the maximum frame length out of frames transmitted in the past, and the like. Also, although an example where the processing shown in FIG. 5 is carried out after a transition to the "15.4 transmission state" ST12 has been described above, it is also possible to carry out the processing shown in FIG. 5 as processing in the "15.4 reception standby/CSL reception idle state" ST30 without a transition to the "15.4 transmission state" ST12.

If the estimated frame transmission completion time is before the time of the transition to the next "CSL reception standby state" ST21, a frame is actually transmitted to the destination node (step S102).

On the other hand, if the estimated frame transmission completion time is at or after the time of the transition to the next "CSL reception standby state" ST21, instead of actually transmitting a frame, a transmission error is set (a transmission error in this case is sometimes referred to as a "fictitious transmission error") without a frame being actually transmitted and there is a return to the "15.4 reception standby/CSL reception idle state" ST30 (step S103). In this case, an apparatus on a higher layer, such as the apparatus control unit 204, is informed of the fictitious transmission error. When informing the higher layer apparatus, it is preferable to clearly indicate that that the error is not a typical transmission error but a fictitious transmission error.

By carrying out the processing shown in FIG. 5, it is possible to prevent from the outset a situation where the transition to the next "CSL reception standby state" ST21 is skipped due to frame transmission. In other words, it is possible to avoid a violation of the rules of CSL Protocol.

When a transmission error or a fictitious transmission error has occurred in the "15.4 transmission state" ST12, retransmission of a frame is carried out.

Figure 6:
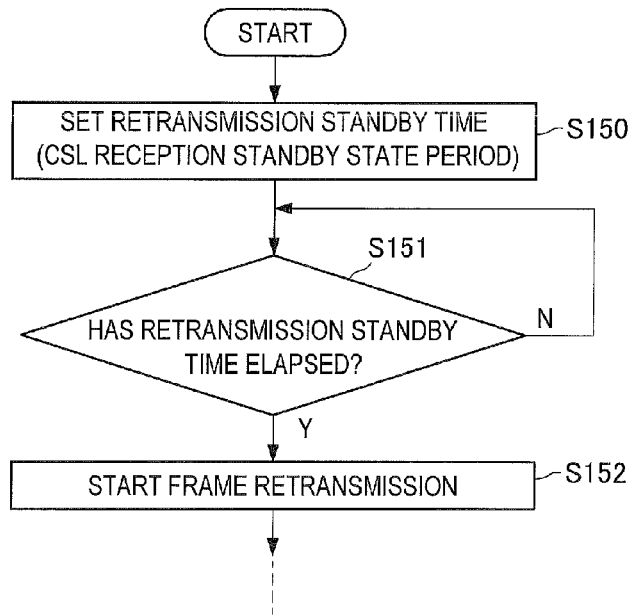
FIG. 6 is a flowchart showing processing that controls frame retransmission timing by a wireless communication apparatus according to the present embodiment.

If the "15.4 transmission state" ST12 has ended with a transmission error (aside from a fictitious transmission error), the 15.4 reception standby/CSL reception idle state processing unit 202a controls the retransmission timing of a frame. FIG. 6 is a flowchart showing such control process. Note that control of the retransmission timing of a frame may be carried out by a processing unit relating to a higher layer (i.e., the apparatus control unit 204 or a processing layer on an even higher layer).

After setting a retransmission standby time as the measured time of a timer (step S150), the 15.4 reception standby/CSL reception idle state processing unit 202a has the retransmission standby time measured (step S151) and when measurement of the retransmission standby time has ended, enters the "15.4 transmission state" ST12 to have the retransmission (transmission) of a frame started (step S152).

In the present embodiment, the "CSL reception standby state period" or a longer time is used as the retransmission standby time when a transmission error (aside from a fictitious transmission error) has occurred. By doing so, it is ensured that there will be a transition to the "CSL reception standby state" ST21 before retransmission, making it possible to prevent repeated retransmission due to state not being the "CSL reception standby state" ST21 when retransmission is carried out (that is, the number of retransmissions is suppressed).

The retransmission process when the "15.4 transmission state" ST12 has ended in a fictitious transmission error is substantially the same as the processing in FIG. 6 described above. However the retransmission standby time used in this case differs to the retransmission standby time for a typical transmission error. As one example, if it is supposed that there is a transition to the next "CSL reception standby state" ST21, there is no reception activation for a frame in such "CSL reception standby state" ST21, and the state returns to the "15.4 reception standby/CSL reception idle state" ST30, the remaining time until the return to the "15.4 reception standby/CSL reception idle state" ST30 under this supposition may be set as the retransmission standby time when there is a fictitious transmission error. The reason that the retransmission standby time when there is a fictitious transmission error is set differently in this way to the retransmission standby time when there is a typical transmission error is as follows. If the "CSL reception standby state period" were set as the retransmission standby time when there is a fictitious transmission error, during the frame retransmission process also, the estimated frame transmission (retransmission) completion time would be at or after the time of the transition to the next "CSL reception standby state" ST21, which would again be handled as a fictitious transmission error.

If, in the "15.4 reception standby/CSL reception idle state" ST30, there is a frame transmission request that uses CSL Protocol from the apparatus control unit 204, the multi MAC protocol control unit 202 fundamentally enters the "CSL transmission state" ST23, carries out frame transmission according to CSL Protocol, and after completion of frame transmission, returns to the "15.4 reception standby/CSL reception idle state" ST30. During such frame transmission, frame transmission is carried out after making frame communication settings relating to transmission using CSL Protocol (setting of the communication channel and setting of PAN_ID).

Note that although FIG. 2 shows only a case where the "CSL transmission state" ST23 is entered from the "15.4 reception standby/CSL reception idle state" ST30, if there is a frame transmission request that uses CSL Protocol in the "CSL reception standby state" ST21, it is possible to make a transition to the "CSL transmission state" ST23. In this case, it becomes possible to carry out frame transmission according to CSL Protocol without waiting for a return from the "CSL reception standby state" ST21 to the "15.4 reception standby/CSL reception idle state" ST30.

(A-3) Effect of Present Embodiment

According to the present embodiment, it is possible to achieve compatibility with two MAC protocols, Normal 15.4 Protocol and CSL Protocol, using a single wireless communication unit. As a result, it is possible to make the wireless communication apparatus according to the present embodiment small and low cost.

(B) Other Embodiments

Although various modifications have been suggested for the embodiment described above, the following examples of modified embodiments can also be given.

Although an example where the retransmission standby time is a fixed period is given in the embodiment described above, it is also possible to allow the operator to externally set such time. Although the set value is arbitrary, as described above, it is preferable to set the "CSL reception standby state period" of the wireless communication apparatus. Even when an external setting is made, it is also preferable to set the "CSL reception standby state period" of the wireless communication apparatus as the default time.

Although the above embodiment describes an example case where conditions aside from the standby time during frame retransmission are not set, it is possible to set a condition whereby the frame retransmission time is a time where the destination node of a 15.4 frame is not in the CSL reception standby state. By using a function of investigating the remaining time until the time at which the destination node enters the "CSL reception standby state" ST21, it is possible to confirm a time where the destination node is not in the CSL reception standby state. For IEEE 802.15.4e nodes, information for managing the MAC layer is managed using a database called a MAC PIB (PAN Information Base) and a function for investigating such set values using a control channel is defined according to IEEE 802.15.4e.

The above embodiment describes a case where the transmission (retransmission) timing of a frame is operated so that there is no transition to the "CSL reception standby state" ST21 even if the timing of a transition to the "CSL reception standby state" ST21 is reached during the "15.4 reception state" ST13 and so that the transition timing to the "CSL reception standby state" ST21 is not reached during the "15.4 transmission state" ST12. However, as an alternative, if the timing of a transition to the "CSL reception standby state" ST21 is reached during the "15.4 transmission state" ST12 or the "15.4 reception state" ST13, it is possible to interrupt the transmission or reception of a frame and make an immediate transition to the "CSL reception standby state" ST21.

According to this modified embodiment, it becomes possible to reliably receive a frame transmitted by another node according to CSL Protocol.

The methods described below can be given as specific examples of methods of interrupting transmission or reception of a frame as described above.

As a first example, if the present state is the "15.4 transmission state" ST12 or the "15.4 reception state" ST13 and the timing of a transition to "CSL reception standby state" ST21 is reached, the present state is interrupted and there is a transition to "CSL reception standby state" ST21.

As a second example, if the timing of a transition to the "CSL reception standby state" ST21 is reached when the present state is the "15.4 reception state" ST13, the present state is interrupted, but if the timing of a transition to the "CSL reception standby state" ST21 is reached when the present state is the "15.4 transmission state" ST12, the present state continues and the transition to the "CSL reception standby state" ST21 is skipped.

As a third example, if the timing of a transition to the "CSL reception standby state" ST21 is reached when the present state is the "15.4 transmission state" ST12, the present state is interrupted and a transmission error is given, but if the timing of a transition to the "CSL reception standby state" ST21 is reached when the present state is the "15.4 reception state" ST13, the present state continues and the transition to the "CSL reception standby state" ST21 is skipped.

As a fourth example, if the timing of a transition to the "CSL reception standby state" ST21 is reached during the "15.4 reception state" ST13, the present state is interrupted and there is a transition to the "CSL reception standby state" ST21, and the transmission (retransmission) timing of a frame is operated so that the timing of a transition to the "CSL reception standby state" ST21 is not reached during the "15.4 transmission state" ST12.

Note that in reality, one skipping operation hardly affects communication according to CSL Protocol.

It may be possible for the operator to select one out of the five methods including the above four examples and the present embodiment described earlier. As one example, such setting is set in the multi MAC protocol control unit 202 via the apparatus control unit 204.

As another example, it is possible to include a method selected out of the five methods mentioned above in an application (program) and for a processing unit on a higher layer to set the selected method in the multi MAC protocol control unit 202 via the apparatus control unit 204.

Although a wireless communication apparatus that is compatible with "multi MAC protocol" is described in the above embodiment, it is also possible to allow a setting of which of "multi MAC protocol", "Normal 15.4 Protocol" and "CSL Protocol" is to be used from a higher level or from the outside. The selectable MAC protocols are not limited to such three types and MAC protocols defined according to other standards or the like may be included.

Although a smart meter has been suggested as an example application of a wireless communication apparatus according to the above embodiment of the invention, it should be obvious that a wireless communication apparatus according to the above embodiment of the invention is not limited to being applied to a smart meter.

Also, although an example where the two MAC protocols are "Normal 15.4 Protocol" defined by IEEE 802.15.4 g and "CSL Protocol" for low power data communication defined by IEEE 802.15.4e is described in the above embodiment, provided there is a similar relationship to that described earlier, the two MAC protocols are not limited to such example.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A wireless communication apparatus, comprising:
  a wireless communication unit that is operative with intermittent reception at irregular intervals;
  wherein the wireless communication unit employs a plurality of Open System Interconnection (OSI) layers, including a physical layer; and
  wherein the wireless communication unit includes a data processing apparatus having a central processing unit (CPU) and memory, the data processing apparatus providing:
    a MAC protocol control unit carrying out state transitions and processing in a present state according to a first MAC protocol and a second MAC protocol that share the physical layer of the wireless communication unit, and
    a frame communication unit carrying out communication of frames according to the first MAC protocol and communication of frames according to the second MAC protocol, whose frame format is the same as the frames according to the first MAC protocol,
  wherein one of the first and second MAC protocols is the Normal 15.4 protocol and the other of the first and second MAC protocols is the CSL (Coordinated Sampling Listening) protocol, and
  wherein the MAC protocol control unit includes a transition state that links between state transitions according to the Normal 15.4 protocol and the CSL protocol, the transition state corresponds to both of CSL reception idle state and 15.4 reception standby state,
  the MAC protocol control unit carrying out processing while in the transition state in accordance with a transition protocol that is a fusion of the Normal 15.4 protocol and the CSL protocol such that a frame transmitted from another wireless communication apparatus according to the CSL protocol is not received and a frame transmitted from another wireless communication apparatus according to the Normal 15.4 protocol can be received,
  in the transition state, if a predetermined period has elapsed from a previous CSL reception standby state the wireless communication apparatus enters the CSL reception standby state, and if a frame is transmitted from another wireless communication apparatus according to the Normal 15.4 protocol the wireless communication apparatus enters 15.4 reception state.

2. The wireless communication apparatus according to claim 1, wherein the second MAC protocol is a MAC protocol intended for lower power data communication than the first MAC protocol.

3. The wireless communication apparatus according to claim 2, wherein states according to the first MAC protocol include at least a frame reception standby state, a frame reception state, and a frame transmission state.

4. The wireless communication apparatus according to claim 3, wherein states according to the second MAC protocol include at least a frame reception standby state, a frame reception idle state, a frame reception state, and a frame transmission state.

5. The wireless communication apparatus according to claim 4, wherein when a present state is the frame reception standby state according to the first MAC protocol, a frame that has been transmitted from another wireless communication apparatus according to the second MAC protocol is not received.

6. The wireless communication apparatus according to claim 4, wherein when a present state is the frame reception standby state according to the second MAC protocol, a frame that has been transmitted from another wireless communication apparatus according to the first MAC protocol is not received.

7. The wireless communication apparatus according to claim 1, wherein the MAC protocol control unit is capable of entering a frame reception state and a frame transmission state according to the first MAC protocol, a frame reception standby state, a frame reception state, and a frame transmission state according to the second MAC protocol, and a linking transition state that is a frame reception standby state according to the first MAC protocol and is also a frame reception idle state according to the second MAC protocol.

8. The wireless communication apparatus according to claim 1, wherein a retransmission standby time that is a period until retransmission is carried out after frame transmission in the frame transmission state according to the first MAC protocol fails is one of equal to a reception standby transition period that is an interval between successive frame reception standby states according to the second MAC protocol and longer than the reception standby transition period.

9. The wireless communication apparatus according to claim 1, wherein a retransmission standby time that is a period until retransmission is carried out after frame transmission in the frame transmission state according to the first MAC protocol fails is set in advance from outside.

10. The wireless communication apparatus according to claim 1, wherein if timing of a change to a frame reception state according to the second MAC protocol is reached when the present state is at least one of a frame reception state and a frame transmission state according to the first MAC protocol, the present state is changed to the frame reception state according to the second MAC protocol.

11. The wireless communication apparatus according to claim 1,
  wherein if frame transmission is activated according to the first MAC protocol when the present state is a frame reception standby state according to the first MAC protocol, one of a completion time and a time until completion of the frame transmission is estimated, it is determined, based on estimated information, whether frame transmission will be completed before timing of a change to a frame reception state according to the second MAC protocol, and if it is determined, based on the estimated information, that it is not possible to complete the frame transmission before the timing of the change to the frame reception state according to the second MAC protocol, a transmission error occurs without the frame transmission being carried out.

12. The wireless communication apparatus according to claim 11, wherein the transmission error is notified to a higher level without the frame transmission being carried out and in a manner that enables the transmission error to be distinguished from other transmission errors.

13. The wireless communication apparatus according to claim 11, wherein one of the completion time and the time until completion of the frame transmission according to the first MAC protocol is estimated from information on a frame to be transmitted.

14. The wireless communication apparatus according to claim 11, wherein the one of the completion time and the time until completion of the frame transmission according to the first MAC protocol is estimated from a transmission time provided in advance.

15. The wireless communication apparatus according to claim 14, wherein the transmission time provided in advance is a time required to transmit a longest frame length in the past.

16. The wireless communication apparatus according to claim 1, wherein even if timing of a change to a frame reception state according to the second MAC protocol is reached when the present state is at least one of a frame reception state and a frame transmission state according to the first MAC protocol, the present state is maintained without a transition to the frame reception state according to the second MAC protocol.

17. The wireless communication apparatus according to claim 1, wherein if timing of a change to the frame reception state according to the second MAC protocol is reached when the present state is at least one of the frame reception state and the frame transmission state according to the first MAC protocol, an externally set response selected out of a first response where the present state makes a transition to the frame reception state according to the second MAC protocol, and a second response where the present state is maintained without a transition to the frame reception state according to the second MAC protocol is taken.

18. The wireless communication apparatus according to claim 1, wherein a communication channel on which a frame according to the first MAC protocol is communicated and a communication channel on which a frame according to the second MAC protocol is communicated differ.

19. The wireless communication apparatus according to claim 1, wherein a network ID that indicates a network to be used and is to be inserted or is already inserted in a frame according to the first MAC protocol differs to a network ID that indicates a network to be used and is to be inserted or is already inserted in a frame according to the second MAC protocol.

20. The wireless communication apparatus according to claim 1, wherein the first MAC protocol is a MAC protocol defined by IEEE 802.15.4g and the second MAC protocol is a MAC protocol defined by IEEE 802.15.4e.

* * * * *